United States Patent [19]

Bonori et al.

[11] 3,833,931

[45] Sept. 3, 1974

[54] MULTICHANNEL SPIN RESONANCE FREQUENCY MEMORY DEVICE

[75] Inventors: Maurizio Bonori; Cafiero Franconi; Paolo Galuppi, all of Venezia, Italy

[73] Assignee: Consiglio Nazionale Delle Richerche, Rome, Italy

[22] Filed: Sept. 21, 1972

[21] Appl. No.: 290,871

[30] Foreign Application Priority Data

Sept. 22, 1971 Italy .................................. 53019/71

[52] U.S. Cl. ............. 340/173 NI, 324/.5 R, 330/4.5

[51] Int. Cl. ..... G11c 11/16, H03f 9/00, G11c 11/20

[58] Field of Search ................ 340/173 NI; 330/4.5; 324/.5 R; 307/88 P

[56] References Cited

UNITED STATES PATENTS

| | | | |
|---|---|---|---|
| 3,401,391 | 9/1968 | Rice | 340/173 NI |
| 3,452,212 | 6/1969 | Gamblin | 340/173 NI |
| 3,452,213 | 6/1969 | Gamblin et al. | 340/173 NI |
| 3,452,340 | 6/1969 | Gamblin et al. | 340/173 NI |

*Primary Examiner*—Stuart N. Hecker
*Attorney, Agent, or Firm*—Lilling & Siegel

[57] ABSTRACT

Frequency memory device composed substantially of a multiple frequency spin induction damped oscillator, the said oscillator being composed of a magnetic spin resonance inductor, joined by means to create a static magnetic field, in respect of which the said spin inductor is properly oriented, at least one spin specimen inserted in the said inductor, and which for that magnetic field has a complete magnetic response spectrum with a total number N>1 of distinct resonance lines. The inductor is joined by means capable of allowing it to oscillate, such as a loop which includes a positive feedback circuit capable of prolonging the damped oscillations on the excited frequencies beyond the duration of the excitation, by acting as a temporary frequency memory, the circuit being connected between the output and the input of the inductor. The positive feedback circuit comprises an amplifier, capable of supplying the loop, of which it is the closing element, a gain of less than unity. The positive feedback loop includes, in addition, a phase corrector and calibrator of all the N frequencies which propagate in the circuit, in such a way as to allow oscillation of the inductor on all or part of the N frequencies, whenever an external oscillatory signal, having a defined frequency spectrum is inserted at any point of the loops.

14 Claims, 8 Drawing Figures

MULTICHANNEL SPIN RESONANCE FREQUENCY MEMORY DEVICE

This invention refers to a multichannel memorizing device of a spectrum of frequency of a modulated electromagnetic wave in which the frequencies to be memorized can vary within a large interval of frequency. The device incorporates a discrete number of channels, or of frequencies, whose values are determined by the magnetic resonance frequencies of a spin specimen, subjected to a static magentic field of appropriate intensity. The memorizing device based on our design is capable of carrying out instant frequency memorization, apart from the presence of an idle time connected with the band width of its channels, and for any required length of finite time.

The problem of instantaneous multichannel memorization of the spectrum of frequency of an electromagnetic oscillation modulated by any form of wave in the form of damped oscillations, of a certain number or of all the frequencies of the said spectrum, has not yet been satisfactorily solved in the more general case where the frequencies of the wave spectrum to be memorized are not known a priori and memorization must be carried out instantaneously or made within a wide interval of frequency with a high number of channels.

A very common multichannel type device capable of memorizing instantaneously the spectrum of frequency of a modulated wave but feasible in practice only for a restricted frequency spectrum of amplitude $\Delta f_o$, is made up of a memory composed of a discrete number, N, of oscillatory circuits, resonating on different frequencies of $f_i$ ($i = 1, 2, 3, \ldots$ N) which are sufficiently close and in ascending order. Each of lhese has its own band $d(f_i)$ of oscillation. The said circuits are N in number such that the lower limit of the working frequency interval of the system, that is the sum $$\sum_{1}^{N} id(f_i) = \Delta f_i$$

is not less than the interval $\Delta f_o$ of the frequency spectrum to be memorized. In this case a number $N$ channels are obtained with respective frequencies $f_1, f_2, f_3, \ldots N$, each having respective band widths $d(f_i)$ which with a total of $N$ channels together cover the desired frequency interval. This multichannel system allows us to memorize the frequency with indetermination, given by the respective $d(f_i)$ of excited channel $f_i$ added to the respective frequency interval between this channel and the adjacent one; that is between $f_i + d(f_i)/2$ and $f_{i+1} - d(f_{i+1})/2$ A device of this type for the temporary memorization of the microwave spectrum of impulses *rf* which has been put into use is the so called "echo box." This memory consists of an echo box whose frequencies, of a discrete number, are included within a certain interval $f$ and are very close. The cavity has a shape such that the electromagnetic oscillation the frequency of which we need to memorize, when placed in the said multimodal cavity, excites those modes whose frequencies appear in its own spectrum. A multimodal resonator of this type can be built with single modes which have a high A factor, and it can be made to reach very high values if it is combined with a positive feedback circuit with an incorporated amplifier. In fact if the loop gain including the said amplifier can be made to reach values very close to unity, we obtain damped oscillation for a required length of time which coincide with the frequencies excited by impulse *rf* which correspond to the time of memorization.

One disadvantage of these devices is that the frequencies are not known very accurately a priori and, more important, are not very stable in time. In addition, when the interval of the frequency spectrum to be memorized is very wide, they require a high number of modes so that it is almost impossible to put it into operation. We can reach analogous conclusions with regard to multichannel memorizers of this type which function for lower frequencies and are therefore obtained with the use of lumped resonant circuits.

The multichannel frequency memory device based on our design, which will also be called multichannel memorizer, consists basically of a device which resonates on several frequencies, which is excited by the components of the frequency spectrum of the wave to be memorized. The said device is joined to a positive feedback circuit capable of prolonging the damped oscillations on the excited frequencies beyond the duration of excitation, constituting in this way a temporary frequency memory.

The resonanting device is composed of a magnetic resonance spin inductor, specifically orientated in a static magnetic field of appropriate intensity. The said inductor contains a spin specimen which has a magnetic resonance spectrum characterized by a total of $N>1$ components and thefore by $N$ distinctive resonance frequencies. The said inductor is connected to an appropriate positive feedback circuit. The positive feedback circuit is such as to allow a damped oscillation on a specific frequency only when a frequency signal corresponding to one of its own frequencies is admitted into the said feedback circuit through an appropriate circuit, which we shall refer to as input circuit. Once this circuit is excited in this way it maintains damped oscillation for a period of time longer than that of excitation.

Therefore such a system acts as a multichannel memory with a number of channels equal to the number $N$ of resonance frequencies of the spin specimen, which are determined both by the nature of the specimens and by the value of the intensity of the static magnetic field.

The multichannel frequency memory device based on our design uses, as basic resonance components, damped magnetic spin resonance oscillators which have lumped or distributed inductance and resonance frequency capacities, as in the socalled echo box. These damped oscillators function on the principle of the phenomenon of emission inducted by the spins in conditions of magnetic resonance.

The technique of magnetic spin resonance, based on the theory developed by Felix Bloch on the detection of electromagnetic energy emitted by excited spins (spin induction) is presently used both for magnetic resonances of nuclear spins, which from now on will be referred to as RMN for Resonance Magnetic Nuclear spin, in the field of radiofrequency, for static magnetic fields of variable intensity from a few gauss up to 100 Kgauss, and for magnetic resonances of electronic spins which will be referred to from now on as RME for Resonance Magnetic Electronic spin. The frequencies of the latter are approximately three grades higher and are therefore also included within the microwave interval, corresponding to the intensity of the static magnetic field used. By the use of appropriate circuits and with appropriate values of $H_o$, it is however possible to observe, in theory, both RMN and RME resonances for any frequency of the electromagnetic spectrum, as long as they can be propagated in the appropriate circuits.

Furthermore, all quantum particles, even if they are not stable particles, can give rise to the phenomenon of magnetic spin resonance, with a parallel phenomenonology. Consequently it is possible, in theory, to obtain a spectrum of magnetic resonance for all quantum particles with a spin and instrinsic magnetic movement that is not zero, as for example, to approximately two thirds of known nuclides, the electron, the neutron, etc. In each case the ratio between the intensity of the static field and frequency depend on the value of the intrinsic magnetic moment of the particle, and, in theory, their magnetic spin resonance can be observed for frequencies included in the whole range of the electromagnetic spectrum.

The theory of the method of spin induction can be sketched briefly as follows. A generator of electromagnetic waves at a fixed frequency of $fo = (\omega o/2\pi)$ feeds a device which produces a resonating magnetic field of the same frequency, of intensity $H_1$, polarized and oscillating along an axis $x$. The specimen containing the spins under observation lies along the lines of force of intensity $H_1$. The spins, excited by the static magnetic field of appropriate intensity $H_0$, begin to resonant and induct an electromagnetic oscillation in a direction perpendicular to $H_o$ which creates a resonating magnetic field of intensity $H_2$ of the same frequency, $fo$, in a device analogous to the first but perpendicular to it. At first this device becomes magnetically decoupled and therefore only draws energy on the polarization of $H_2$. The two devices put together, which create the perpendicular magnetic fields $H_1$ and $H_2$, have the name of "Bloch inductor" or more simply "inductor" and it is by this name that it will be referred to from now on. The device which generates field $H_1$ will be referred to as "input" and the device in which the signal inducted by spin appears will be referred to as "output." The condition of resonance is $\omega_o = \gamma H_o$ in which $\gamma$ is the constant characteristic of the particles under observation, which also depends on the value of their spins. Therefore, for a given value of the magnetic field $H_o$, there is only one resonance frequency $f_i = (\omega_i/2\pi)$ in Hz defined by a precision $d(f_i)$ given by the width of the line of resonance of the spins of that specimen.

Another characteristic of magnetic spin resonances which must be taken into consideration is the time or relaxation $T_1$, which characterizes both the exponential process of alignment of the spins in the external magnetic field, and the achievement of stationary conditions of resonance. Moreover, the width of each line of resonance can be described by a second relaxation time $T_2$ which has a value which in some cases coincides with that of $T_1$.

According to the frequencies concerned, the inductors can take the form of coils, or analogous lumped-constant devices, or of cavities or analogous distributed constant devices. For example, we are familiar with inductors composed of pairs of cross coils, in the field of radiofrequency, or bimodal cavities with degenerated perpendicular modes in the microwave field. Other types of inductors, however, can be used in the same and other frequency intervals for the entire electromagnetic spectrum.

It is a well-known fact that damped oscillators can be constructed using spin specimens which provide a resonance line in a magnetic field of appropriate intensity by making use of suitable inductors for the chosen frequency interval and of a suitable positive feedback circuit incorporating an amplifier the input of which is connected to the output of the inductor, and the output of which is connected to the input of the said inductor.

In these spin oscillators oscillation takes place because the resonating specimen couples the two oscillating fields $H_1$ and $H_2$, which are perpendicular to each other — and therefore theoretically decoupled — by means of the presence of the signal inducted by the spins. In fact, if the signal inducted by the spins is led to the output of the inductor in the input circuit of an amplifier, and if the loop containing the amplifier has a gain very close to unity and is supplied with a phase equalizer, the same signal in an amplified form, will generate a field of excitation $H_1$. In this way a damped oscillation will be produced the duration of which is controlled by the value of the loop gain. In addition there will be a signal induced solely for the resonance frequency of that particular spin specimen. Consequently only for this frequency will the two fields $H_1$ and $H_2$ (and therefore also the input and the output of the amplifier) no longer be de-coupled. Damped oscillations in the system, therefore, are only possible for this frequency. The resonating spins act therefore as a band pass selective filter, allowing damped oscillation only on that particular frequency, whose resonance condition is fulfilled. Naturally the stability of an oscillator of this type is dependent on either the width of the resonance line ($^1/T_2$), or else on the fluctuation of the static magnetic field, according to which of the two is greater.

The time needed for this system to reach maximum oscillation value under the influence of external excitation is dependent, essentially, on the relaxation time ($T_1$) of the spins of the specimen. An oscillator of this kind can be constructed, in theory, for any frequency in the electromagnetic spectrum.

The multichannel memorizing device for magnetic spin resonance frequencies based on our design, functions as follows. A basic damped oscillator of the spin induction type is taken, with a spin specimen which has a magnetic resonance spectrum with a total of $N>1$ lines. For a specific value $H_o$, which must be uniform on the said specimen, the said lines resonante at different frequencies which can be represented respectively by: $\omega_1 = (\gamma_1 H_o)$ ; $\omega_2 = (\gamma_2 H_o)$ . . . $\omega_N = (\gamma_N H_o)$, where $\gamma_i = (\gamma_{i-1} + J/H_o)$ if, for example, the components are uniformly spaced by a quantity J of frequency measured in rad sec $^{-1}$.

This specimen has simultaneously verified the conditions of resonance for all the $N$ lines of its spectrum for $N$ oscillatory fields $H_1$ of excitation, of respective frequencies equal to: $\omega_1, \omega_2, \ldots \omega_N$, which simultaneously excite the specimen itself. Therefore, with a specimen that has $N$ single lines, we can construct a damped oscillator on its $N$ possible resonance frequencies.

In order to make damped oscillation on the $N$ frequencies possible, the feedback circuit must be supplied with a phase equalizing device as well as an amplifier, to allow correction of the phases of the single oscillations at different frequencies, present in the circuit itself.

In order that this damped oscillator can function as a memorizer, spontaneous oscillation, caused by excitation of the spins by the noise of the output of the amplifier on all possible frequencies must be eliminated and therefore loop gain must be less than unity. However, oscillation on its own frequency can be kept up for any desired length of time if an oscillating wave is inserted in some way, even temporarily, into the feedback circuit. The frequency of this wave must coincide with that of the lines of a spectrum. In any case, spontaneous persistent oscillation is not possible for those signals which are induced by an excitation originating from the components of the frequencies $\omega_1 \ldots \omega_N$ of the spectrum of the noise of the output of the amplifier, since the total gain of the loop is inferior to unity. For the same reason, oscillation induced by an external signal cannot be persistent.

A memorizing device of this type is referred to as an N-channel spin resonance memory which functions, according to our invention, for any frequency interval on the electromagnetic spectrum and for any type of quantum particle which has spin and magnetic moment which is not zero, for appropriate values in the static magnetic field. Depending on the frequencies concerned, we can nevertheless vary the means by which we obtain induction devices and amplifiers within which, naturally, the electromagnetic oscillations at respective frequencies must be propagated.

It will be easier to understand how the invention functions from the description of a few of the uses to which it can be put. The examples listed serve as an indication and are not limitative. They are to be studied in conjunction with the enclosed diagrams.

In the various applications, the functionally equivalent components are indicated by the same numbers, or distinguished by a letter.

Figure 1:
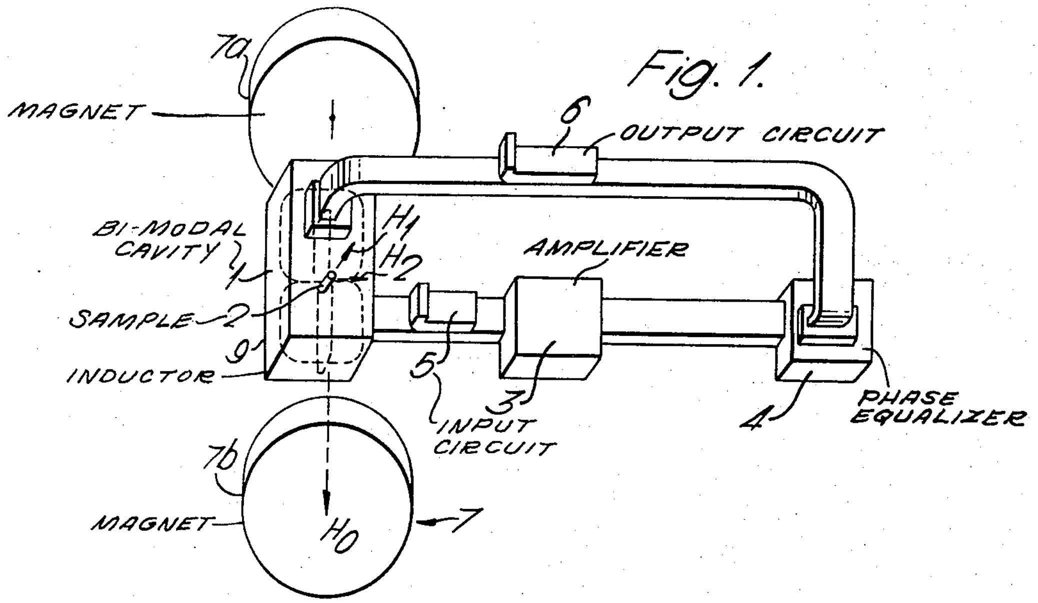
FIG. 1 is a three-dimensional block diagram of a memorizing device based on our invention, which functions in the microwave interval.
Figure 2:
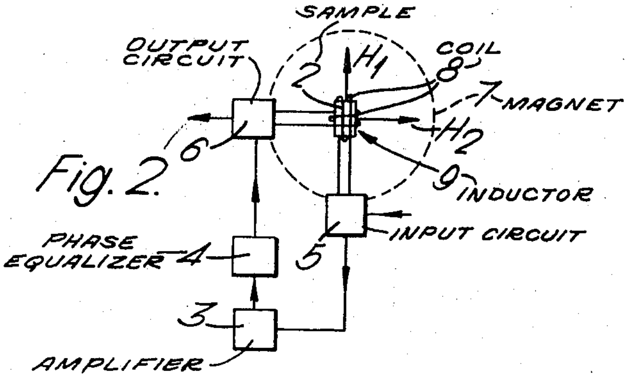
FIG. 2 is a block diagram of a memorizing device which functions in the radio-frequency interval.

Typical examples of memories based on our invention and which function, to quote an example, in the microwave and radio-frequency fields, are sketched respectively in FIGS. 1 and 2. In FIG. 1 the memory consists of an inductor 9, with a bimodal cavity, 1, containing a spin specimen, 2, and positive feedback circuit, connected by wave-guides between its input and its output, and composed of an amplifier, 3, and a phase equalizer 4. The input circuit of the signal the frequency of which we want to memorize is represented by coupling 5, while the output circuit is indicated by coupler 6. The static magnetic field is produced by polar expansion, 7a and 7b, of a magnet, generally indicated by the number 7. Spin specimen 2 is placed in the bimodal cavity, 1, of spin inductor 9, and aligned along the lines of force of oscillating magnetic field H1, which is excited through a wave guide and the respective iris by the microwave energy emitted from amplifier 3. The induced signal of the spins of sample 2 excites the second mode of cavity 1, thus producing an oscillating magnetic field H2. The energy of this field is drawn by means of wave-guides through the respective iris and led to the input of amplifier 3. In addition, a directional coupler, 5, is inserted on the wave-guide for the inlet of external electromagnetic oscillation, the frequency of which is to be measured, even if, of course, different inlet systems for the external signals can be designed and positioned on other points in the circuit. For appropriate values of the phase/shift let in by phase equalizer 4, damped microwave oscillations can be produced in the system by a positive feedback of appropriate value, the frequencies of which fulfil the resonance conditions for the N components of spectrum RME of spin specimen 2, for that value of $H_o$ generated by magnet 7.

In FIG. 2, the memorizer includes a crossed coil, 8, inductor, 9, containing spin specimen 2. This inductor is joined to a positive feedback circuit connected between its input and its output and consisting of amplifier 3 in series with phase equalizer 4. The input circuit of the signal the frequency of which we have to memorize, is indicated by block 5, while the output circuit is indicated by block 6. The static magnetic field is produced by magnet 7.

In inductor 9, spin specimen 2 is aligned along the lines of force of oscillating magnetic fields $H_1$, produced by one of the coils 8, fed by amplifier 3, through phase equalizer 4. The magnetic field $H_2$ induced by the resonating spins, and oscillating on the specimen, transmits the induction signal to the second coil 8, which is perpendicular to the first and connected to the input of amplifier 3, thus closing the positive feedback loop. The external oscillation the frequency of which we have to memorize, is let into the feedback circuit through coupler 5 and the memorized frequency is let out through coupler 6.

Both in the microwave and the radiowave fields, spin inductors different from the types represented in FIGS. 1 and 2 can be used.

It is possible to construct a series of memories derived from the one illustrated in FIGS. 1 and 2, and obtained by combining several spin specimens, several inductors, several amplifiers, several phase equalizers, which can also be combined for different values of $H_o$. All these derived memories, nevertheless, fall within the scope of the present invention. As an example, a few of these derived memories have been illustrated in FIGS. 3 to 8. All the circuits corresponding to the various blocks described in FIGS. 3 to 8 can be built in such a way as to allow the propagation of electromagnetic waves in the desired interval of the electromagnetic spectrum.

A memory based on our invention can be obtained with several distinct memories, operating in adjacent frequency intervals, so as to widen the global working frequency intervals, and at the same time, increase the number of available channels. In fact, by having a memory which uses a spin specimen which has a spectrum containing N distinct lines, it is possible to cover a frequency interval *m* times wider than that covered by the said specimen, and with *m* memories each containg a spin specimen in the same number of regions of the airgap of a magnet which has values for $H_o$ different from the necessary sum, so that the respective specimens cover adjacent frequency intervals. Furthermore, by appropriately choosing the values of $H_o$ which act upon the various specimens, it is also possible to construct a memory which has any desired global number of channels within a specific interval, using any number of memories placed in regions of static magnetic field of appropriate intensity. The extension of the global working frequency of a memory, following the principles of our invention, and the increase in the number of its frequency channels within a specific frequency interval, can be obtained with several memories having identical spin specimens or different spin specimens. These spins, therefore, have different magnetic resonance spectrums, both in terms of number, and in terms of position of the components of the respective resonances. Analogous results can be obtained with several identical or different spin specimens placed in a single inductor. Each of these specimens is subjected to a magnetic field of the appropriate intensity.

All the memories described in FIGS. 3 to 8 can contain one or more different or identical spin specimens, subjected to static magnetic fields of the same or of different intensities.

Figure 3:
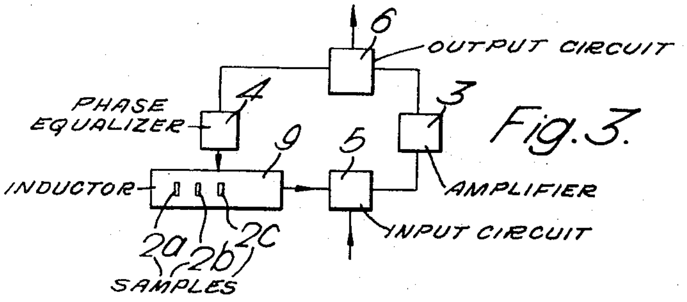
FIG. 3 is a block diagram of a memorizing device which function for any interval in the electromagnetic spectrum.

With particular reference to FIG. 3, the block diagram represents a memory based on our invention which functions for any interval of the electromagnetic spectrum. It is composed of an inductor, 9, containing several spin specimens, 2*a*, 22*b*, 2*c*, . . . and a feedback loop composed of amplifier, 3, phase equalizer, 4, of the input, 5, of the signal, and output, 6, of the signal.

Figure 4:
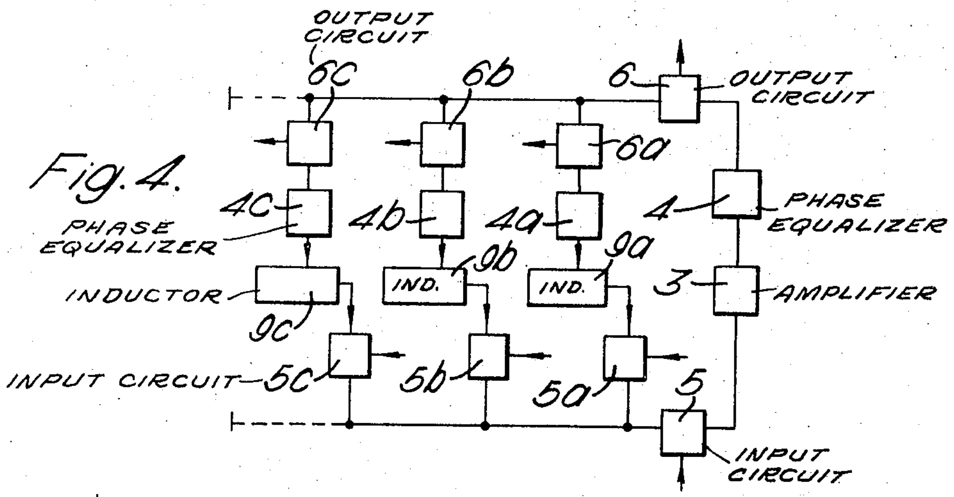
FIG. 4 represents a block diagram of another application of the memorizing device based on our invention.

FIG. 4, instead, represents a block diagram of a memory based on our invention, which consists of several inductors, 9*a*, 9*b*, 9*c*, . . . joined to a single feedback loop which includes amplifier blocks, 3, and phase equalizer 4, of the input, 5, of the signal and the output, 6, of the signal. All the inductors can, in addition, have their own input blocks, 5*a*, 5*b*, 5*c*, . . . of the signal, and output blocks, 6*a*, 6*b*, 6*c*, . . . of the signal, and of the phase equalizer 4*a*, 4*b*, 4*c*, . . .

Figure 5:
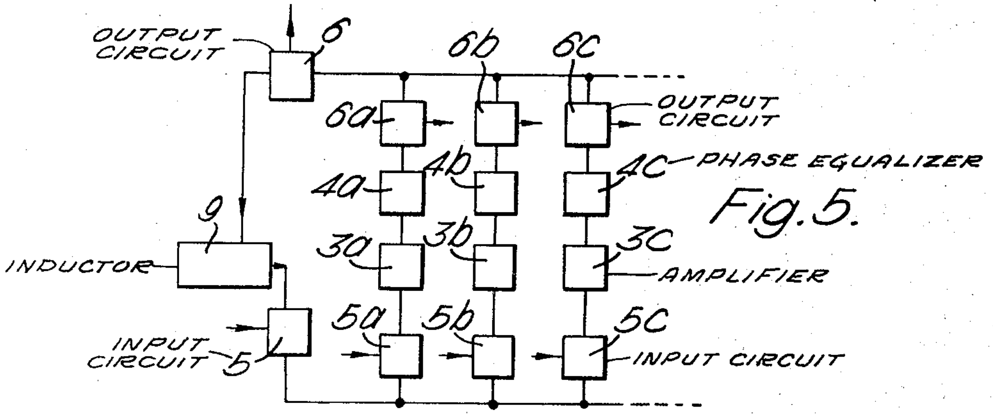
FIG. 5 represents a block diagram of another application of the memorizing device based on our invention.

FIG. 5 represents the block diagram of a memory based on our invention, composed of a single inductor, 9, joined to several feedback loops. All the loops have their own respective amplifier blocks, 3*a*, 3*b*, 3*c*, . . . , phase equalizer 4*a*. 4*b*, 4*c*, . . . , input block 5*a*, 5*b*, 5*c*, . . . , and output blocks, 6*a*, 6*b*, 6*c*, . . . of the signal.

Figure 6:
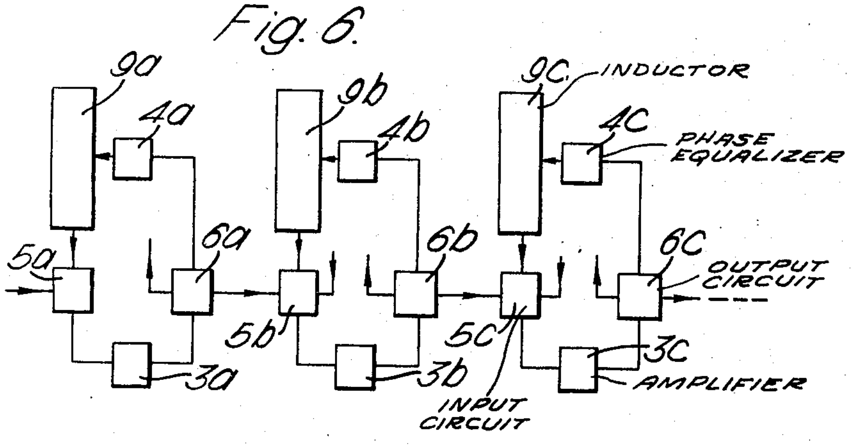
FIG. 6 represents a block diagram of another application of the memorizing device based on our invention.

FIG. 6 represents the block diagram of a memory in several sections, in which each section consists of an inductor, 9*a*, 9*b*, 9*c*, . . . , each of which is joined to its own feedback loop including respective amplifier blocks 3*a*, 3*b*, 3*c*, . . . , phase equalizer, 4*a*, 4*b*, 4*c*, . . . input, 5*a*, 5*b*, 5*c*, . . . , output, 6*a*, 6*b*, 6*c*, . . . of the signal. The sections are joined to each other in series, so that the output, 6*a*, of the first section of the memory is also connected to the input, 5*b*, of the second memory and so on. However, each can also function independently, since each has its own input and output blocks.

Figure 7:
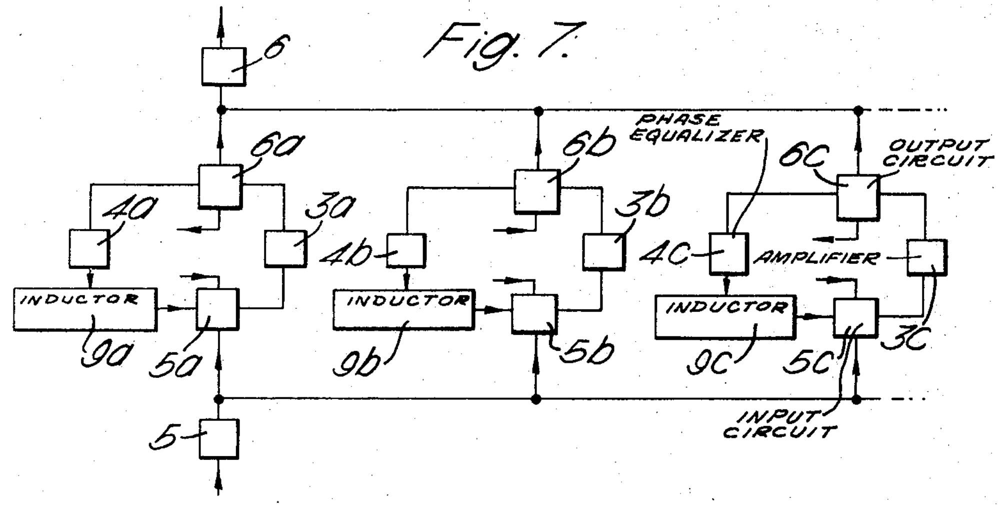
FIG. 7 represents a block diagram of another application of the memorizing device based on our invention.

FIG. 7 represents the block diagrams of a memory in several sections each of which consists of an inductor, 9*a*, 9*b*, 9*c*, . . . , each of which has its own feedback loop, including respective amplifier blocks, 3*a*, 3*b*, 3*c*, . . . , phase equalizer, 4*a*, 4*b*, 4*c*, . . . , input, 5*a*, 5*b*, 5*c*, . . . and output, 6*a*, 6*b*, 6*c*, . . . , of the signal. The sections are connected in parallel, in such a way that all the outputs, 6*a*, 6*b*, 6*c*, . . . , are connected together, as well as all the inputs 5*a*, 5*b*, 5*c*, . . . , even if the memory has a single input block (5) and a single output block (6) for the signal.

Figure 8:
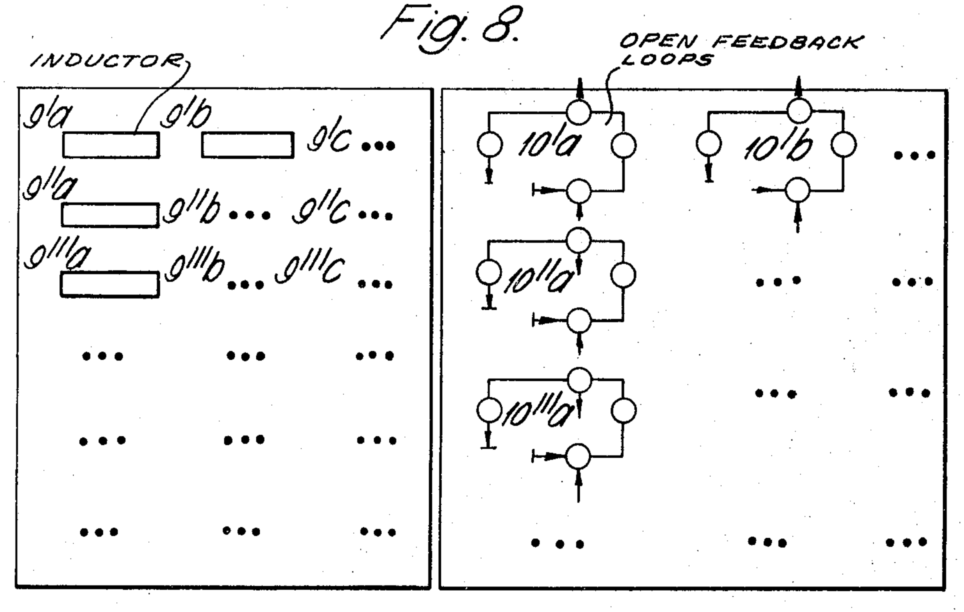
FIG. 8 represents the block diagram of two matrixes composed of inductors and open feedback loops which can be laid out in various ways.

FIG. 8 represents two matrixes, one composed of any number of unities of inductors 9, and the other of open feedback loops 10. The latter include amplifier blocks, equalizers and input and output circuits. These open feedback loops are joined by means, so that they can be combined in various ways, numerically and in any way, in order that they can consequently be also closed, by other means, with also any number of inductors. The resulting section can be connected in series or in parallel, or in series-parallel, in any way also with any number of auxiliary input and output circuits of the signals, placed on any point of the complete multiloop network thus formed.

It must be pointed out that the memories described in FIGS. 3 to 8, it is possible to obtain a total of N channels with a magnetic field which has a gradient in a given direction having a total number N of identical specimens, which also have only one resonance line of the required characteristics along the direction of the gradient, which is not zero. These specimens are separated from each other by the necessary distance in order to obtain the required separation of channel frequency and are all contained in the same or in more than one inductor.

The multichannel memorizing device based on our invention, and its various possible illustrated and described forms, and others that can be obtained on the basis of the same informing principle, offers numerous advantages with respect to more well-known frequency memories.

For example, in the case of a memorising device which uses only one bimodal cavity and one spin specimen of a volume of about 0.5 cc, containing only one type of free organic radical, it is possible to obtain, for appropriate values of $H_o$, a memory which occupies a relatively small space, but which incorporates, nevertheless, several hundreds of channels, uniformly far and near to each other. In addition, a memory of this type is easily constructed and has very little bulk. In fact, specimens of free organic radicals which have multiple RME resonances of over 1,000 components are easily obtained. The separation between the lines of these spectrums is in the order of a few MHz and is generally relatively uniform. Relaxation times of the relative resonances are in the order of $10^{-6}$ sec, or even lower, and, therefore, the width of the line of their components is near to 1 MHz. Therefore a multichannel memory device based on this invention can be obtained in practical terms in the microwave field with an idle time of less than 1 microsecond.

It is therefore possible to construct a memory based on the present invention for the entire interval of band X (from 8.2 GHz to 12.4 GHz) with about 20 identical spin specimens of this type, each having about 200 lines, placed in an equal number of regions of the same magnetic field or fields, produced by different magnets, having intensities of magnetic field of respectively increasing values of about 75 by 75 gauss and absolute values included in the interval of about 2,700 to about 4,200 gauss, approximately.

With a complex of spin specimens of this type, it is possible to construct a memory which covers the whole of the abovementioned band X with about 1,500 channels, each at a distance of about 3 MHz from each other, with a frequency definition in the order of ± 1.5 MHz. In comparison, the construction of an echo box oscillating on about a hundred different uniformly spaced frequency modes involves considerable planning and practical difficulties. In addition it is difficult to achieve frequency stability. Furthermore, memories of the echo box type are even less suitable for radiofrequencies.

A further advantage of the memory based on this invention, is that its frequencies can be easily calibrated beforehand, by producing the magnetic resonance spectrum of the spin specimen. They remain perfectly constant in time within the limits of the fluctuations of the value of the intensity of the static magnetic field $H_o$ and of the value of the respective line widths.

The memory device based on this invention has the further advantage of being easily tuned for frequency, even through keeping constant the separation between the various frequency channels. In fact, it is possible to produce a shift of the entire frequency interval by means of a simple and appropriate variation of the intensity of the static magnetic field $H_o$, which can also be obtained by means of auxiliary coils fed by direct current and coiled around the inductor. It is therefore easily possible to shift the working band of a memory based on this invention with electric impulses.

The memory based on this invention can be used to memorize both monochromatic and non monochromatic oscillations. In the case of the latter, the device memorizes those frequencies of their spectrum the values of which coincide with the frequencies of the frequency channels of the device itself. Consequently, a memory based on this invention can memorize the frequency spectrum of oscillations modulated by impulses, as long as the impulses have a duration greater or comparable to the relaxation time of the resonances.

Compared to cavity memories of the echo box type, and those derived from it, which function in the microwave field, the memory based on this invention offers the advantage that the frequency memorized remains constant in time, independently of the working condition of the circuits and the cavity, and of environmental conditions. This also easily allows the use of a much greater number of channels in concordance with the complexity of the appliance.

Compared to the known sweep memories, the memory based on this invention has the further advantage of being able to memorize the frequency spectrum of a wave modulated by impulses, even if the impulses are of a very short duration. It is thus able to vary the relaxation times of the single resonances within considerably wide limits. Furthermore, known sweep memories use klystron or BWO tubes, for example, in the microwave interval, which are highly expensive and have limited average life. Whereas a memorizing device based on this invention may utilize, also at microwaves, solid state circuits, which are less expensive and have a much longer average life.

These advantages, then, place the memory based on this invention well above any other type of frequency memory, known up to the present, moment for oscillations, in any case modulated, frequencies of the electromagnetic spectrum.

Modifications can be made to the present invention without going too far from the pre-established aim. It is assumed, therefore, that these modifications will not be outside the protective limits of the present invention.

We claim:

1. A frequency memory device comprising a multiple frequency spin induction damped oscillator, said oscillator comprising a magnetic spin resonance inductor having an output and input and being formed by means for creating a static magnetic field, said spin inductor being properly orientated with respect to said static magnetic field, at least one spin specimen inserted in said inductor, said specimen having a complete magnetic resonance spectrum with a total number of N distinct resonance lines for said static magnetic field, said inductor being joined by circuit means capable of allowing said inductor to oscillate, said circuit means including a loop which comprises a positive feedback circuit capable of prolonging the damped oscillations on the excited frequencies beyond the duration of the excitation, by acting as a temporary frequency memory, said circuit means being connected between the output and the input of the inductor, said positive feedback circuit having a gain of less than unity, said loop comprising a phase corrector and calibrator of all said N frequencies which propagate in the circuit so as to allow oscillation of the inductor on all or part of the N frequencies, whenever an external oscillatory signal, having a defined frequency spectrum is inserted at any point of the loop.

2. A frequency memory device as specified in claim 1, wherein said spin specimen is formed of a plurality of specimens, each having magnetic fields of different intensities to form a plurality of memory channels.

3. A frequency memory device as set forth in claim 1, comprising a plurality of memories connected to each other in series.

4. A frequency memory device as set forth in claim 1, comprising a plurality of memories connected in parallel with the respective outputs connected together, and the inputs of the respective memory being connected together.

5. A frequency memory device as specified in claim 1, comprising a plurality of inductors each containing spin specimens and feedback loops, said feedback loops being connected in series.

6. A frequency memory device as set forth in claim 1, wherein N is equal to one.

7. A frequency memory device as set forth in claim 1, comprising a plurality of inductors, each containing spin specimens and feedback loops, said feedback loops being connected in parallel.

8. A frequency memory device as set forth in claim 1, comprising a plurality of inductors, each containing spin specimens and feedback loops, said feedback loops being connected in series-parallel.

9. A frequency memory device as specified in claim 1, in which said spin specimen is placed on a single inductor.

10. A frequency memory device as set forth in claim 9, wherein said spin specimen is inserted in regions of different magnetic intensity.

11. A frequency memory device as specified in claim 1, operative for a total of N frequencies of predetermined width comprising a plurality of inductors connected to a single feedback loop, each inductor containing at least one spin specimen.

12. A frequency memory device as set forth in claim 11, wherein each said spin specimen in said single feedback loop is different.

13. A frequency memory device as specified in claim 1, operative for a total of N frequencies of predetermined magnitude, comprising a single inductor containing at least one spin specimen being joined to a plurality of positive feedback loops, all said loops being connected to said single inductor.

14. A frequency memory device as set forth in claim 13, wherein said one spin specimen is placed in regions of different magnetic intensity.

* * * * *